United States Patent Office 3,128,831
Patented Apr. 14, 1964

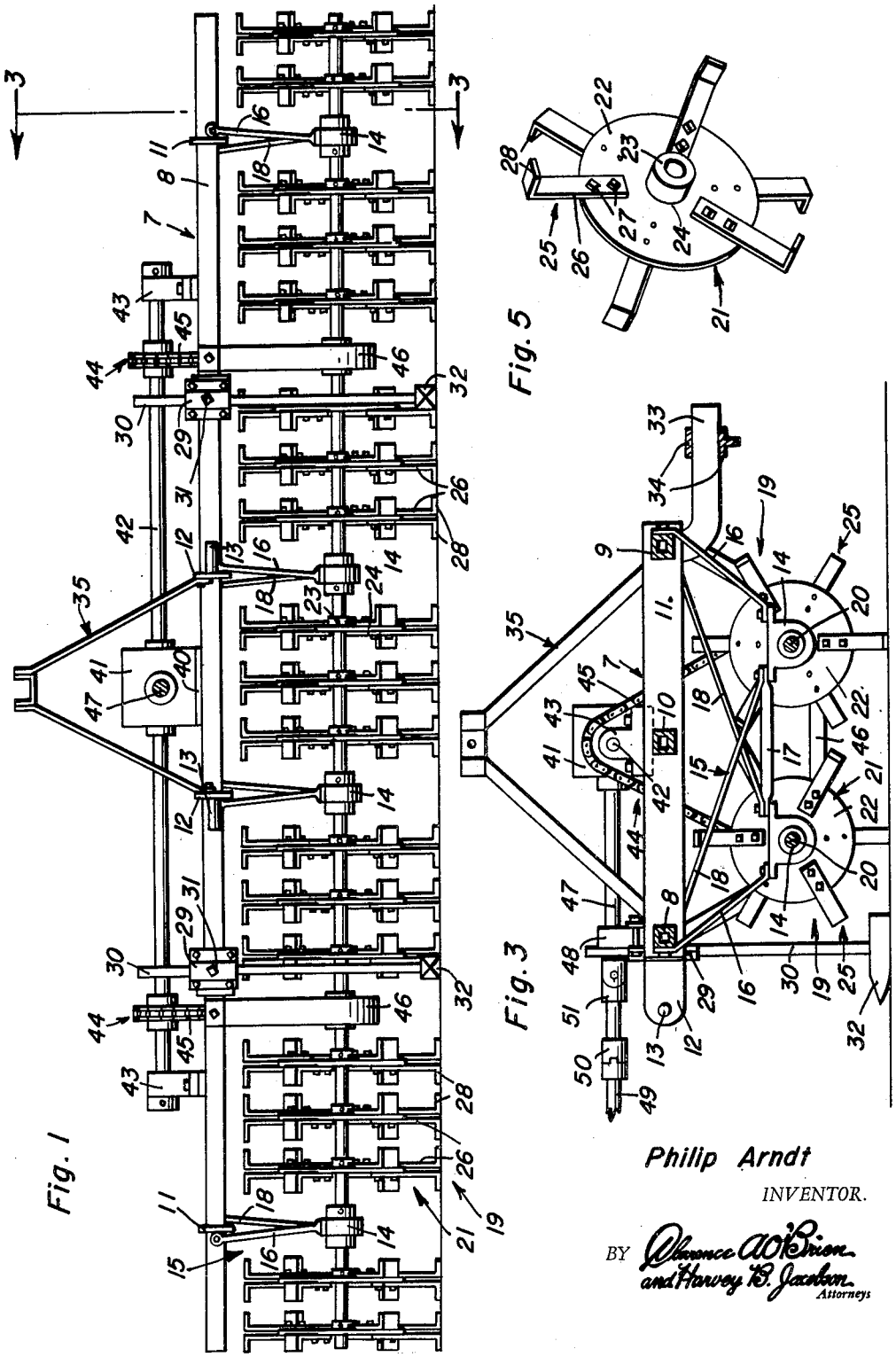

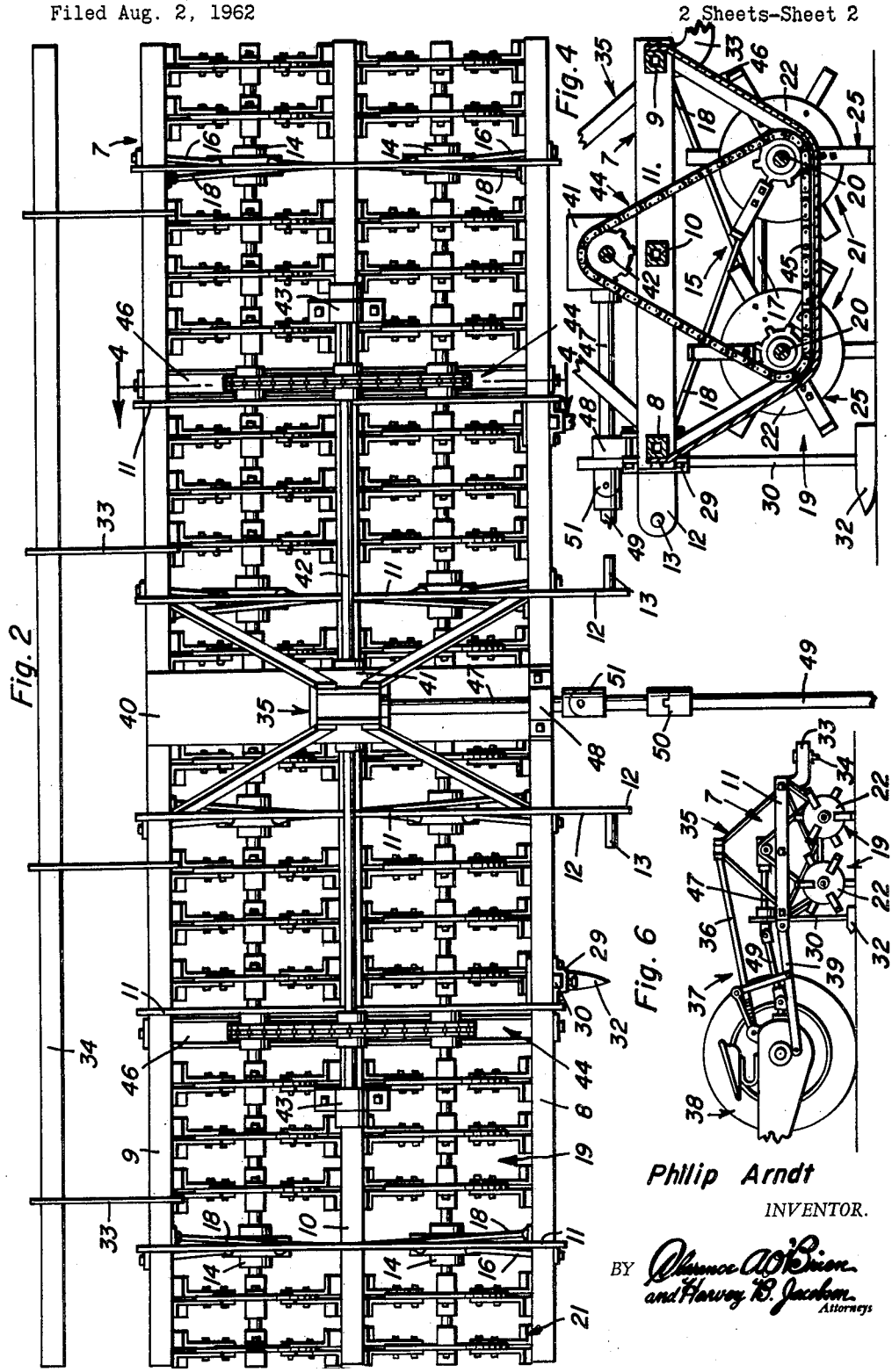

3,128,831
CULTIVATOR AND MULCHER
Philip Arndt, Rte. 2, Box 293, Ontario, Oreg.
Filed Aug. 2, 1962, Ser. No. 214,298
4 Claims. (Cl. 172—123)

This invention relates generally to new and useful improvements in agricultural implements and has for its primary object to provide, in a manner as hereinafter set forth, an implement of this character which is adapted to thoroughly cultivate and mulch the soil simultaneously.

Another highly important object of the present invention is to provide a combination implement of the aforementioned character which is particularly adapted to cultivate and mulch close row crops such as beets, onions, etc.

Still another important object of the invention is to provide a cultivator and mulcher which is adapted to be readily mounted for operation on the rear of a conventional farm tractor and driven from the usual power take-off thereof.

A further object is to provide, in a cultivator and mulcher comprising a pair of parallel rotors, unique means for driving said rotors in unison.

Other objects of the invention are to provide a combined cultivator and mulcher of the character set forth which is comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in front elevation of an implement constructed in accordance with the present invention;

FIGURE 2 is a top plan view thereof;

FIGURE 3 is a vertical sectional view, taken substantially on the line 3—3 of FIGURE 1;

FIGURE 4 is a vertical sectional view, taken substantially on the line 4—4 of FIGURE 2;

FIGURE 5 is a perspective view of one of the rotary tool units; and

FIGURE 6 is a side elevational view, showing the implement connected to a tractor.

Referring now to the drawing in detail, it will be seen that the embodiment of the invention which has been illustrated comprises a horizontal frame of suitable metal which is designated generally by reference numeral 7. The frame 7 includes spaced, parallel, transverse front, rear and intermediate bars 8, 9 and 10, respectively, which are square in cross-section, as shown to advantage in FIGURE 4 of the drawing. The transverse tubular bars 8, 9 and 10 are fixed in openings which are provided therefor at spaced points in flat, longitudinal bars 11. The two innermost bars 11 project forwardly beyond the front transverse bar 8, as indicated at 12, and have fixed thereon outwardly projecting pins or the like 13.

Front and rear series of transversely aligned bearings 14 are mounted beneath the frame structure 7 by suspension means 15. The suspension means 15, in the embodiment shown, includes hangers 16 in the form of downwardly convergent rods which depend from the front and rear bars 8 and 9 and have their lower ends affixed to the pairs of front and rear bearings 14. Extending between the front and rear bearings 14 are spacing bars 17. The suspension means 15 further includes rods 18 which also have one end connected to the bars 8 and 9, the lower end portions of said rods 18 being crossed and connected to the end portions of the spacers 17. Thus, a light but extremely rigid supporting structure is provided for the bearings 14.

The assembly 14 to 18, inclusive, has mounted thereon spaced, parallel, transversely extending front and rear rotors which are designated generally by reference numeral 19. The rotors 19 comprise transverse shafts 20 which are journalled in the bearings 14. Mounted on the shafts 20 are tool units 21. The units 21 include disks 22 of suitable metal which are secured at spaced points on the shafts 20. The disks 22 include hubs 23 having mounted therein setscrews 24 which secure the disks 22 in position on the shafts 20. Bolted on the disks 22 and radiating therefrom are angular tools or tines 25 of suitable metal. The tools 25 comprise shanks or the like 26 which are detachably secured at 27 to the disks 22. At the outer ends thereof, the shanks 26 terminate in right angularly extending blades 28. As shown to advantage in FIGURE 1 of the drawing, the units 21 of the rotors 19 are arranged in groups which are spaced from each other for the passage of the row crops therebetween.

Also mounted on the front bar 8 of the frame 7 are transversely spaced, vertical sleeves 29. Shanks 30 are mounted for vertical sliding adjustment in the sleeves 29. Setscrews 31 secure the shanks 30 in adjusted position. Fixed on the lower end portions of the shanks 30 are ground-engaging shoes or runners 32.

Mounted at spaced points on the rear bar 9 of the frame structure 7 is a plurality of downwardly and rearwardly extending arms or brackets 33 of suitable metal. Vertically spaced tool bars 34 are affixed to the brackets 33. As best seen in FIGURE 3 of the drawing, the lower tool bar 34 is T-shaped in cross-section.

Mounted on an intermediate portion of the frame 7 and extending upwardly therefrom is a hanger 35 through the medium of which the implement is pivotally suspended from the usual top or compression links 36 of a conventional hydraulic linkage system 37 on the rear of a farm tractor 38. The bottom or tension links 39 of the system 37 are journaled on the pins 13 for connecting the implement to the tractor to be pulled and carried thereby in the usual manner.

Mounted longitudinally on an intermediate portion of the frame 7 beneath the hanger 35 is an elongated plate or platform 40. Mounted on the platform 40 over the intermediate frame bar 10 is a gear box 41. Extending transversely through the gear box 41 is a shaft 42 having its end portions journaled in bearings 43 which are provided therefor on the intermediate bar 10 of the frame 7. The shaft 42 drives the rotor shafts 20 through chain and sprocket connections 44. The horizontal lower runs of the chains 45 of the drives 44 travel in guards in the form of generally U-shaped channel bars 46 which have their end portions secured to the front and rear bars 8 and 9, respectively, of the frame 7.

A short drive shaft 47 enters the box 35 and is geared to the shaft 42. The forward end portion of the shaft 47 is journaled in a bearing 48 provided therefor on the front bar 8 of the frame 7. The shaft 47 is operatively connected to the usual power take off of the tractor 38 by a suitable shaft 49 comprising a conventional clutch 50, a universal joint 51, etc.

It is thought that the operation of the implement will be readily apparent from a consideration of the foregoing. Briefly, the device is mounted on the tractor 38 in the usual manner and connected to the power take off thereof. Of course, the rotors 19 are driven in unison at the desired speed from the power take off of the tractor through the shaft 49, the shaft 47, the gears in the box 41, the shaft 42 and the chain and sprocket drives 44. Thus, the tool units 21 are actuated for cultivating and mulching the soil in an obvious manner. The vertically adjustable shoes or runners 32 may function as depth gauges for the tools 25. The generally U-shaped channel guards 46 effectively protect the drive chains 44 at all times, said guards being adapted to ride easily over obstructions which may be encountered. This constitutes an important and desirable structural feature of the implement. As best seen in FIGURE 5 of the drawing, the tools 25 are mounted alternately on opposite sides of the disks 22. The tools 25 are removable and reversible and, if desired, may be so mounted that the blades 28 thereof extend across the peripheries of the disk 22. As the implement moves forwardly the row crops pass between the spaced groups of units 21. Of course, any suitable tools may, if desired, be mounted on the tool bars 34 for operation behind the rotors 19.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A row crop cultivator comprising, in combination, a horizontal transversely elongated frame including spaced, parallel, tubular front, rear and intermediate bars of square cross-section, said frame further including a plurality of spaced, parallel, flat longitudinal bars having square openings therein having the tubular bars extending therethrough and fixedly secured therein, downwardly convergent rods on the front and rear bars, bearings on the lower end portions of said rods, longitudinal spacing bars extending between the bearings, a pair of spaced, parallel transverse rotor shafts journaled in the bearings, crossed rods secured at their ends to the front and rear bars and to the end portions of the spacing bars, spaced groups of disks on the rotor shafts, tools radiating from said disks, a pair of longitudinal guards mounted beneath the frame, said guards including generally U-shaped channel bars comprising straight horizontal bight portions extending beneath the rotor shafts and adapted to slide over obstructions, said channel bars further comprising upwardly divergent end portions affixed to the front and rear bars, a shaft journaled on the intermediate bar in parallelism therewith, means comprising triangular sprocket chains operatively connecting the second-named shaft to the rotor shafts, said chains including horizontal lower runs operable in said bight portions of the channel bars, and means for operatively connecting the second-named shaft to a power takeoff of a tractor for actuation thereby.

2. The combination of claim 1, certain of said flat longitudinal frame bars extending forwardly beyond the front bar, and lateral pins on the forward end portions of said certain longitudinal frame bars for pivotally connecting the frame to a hydraulic linkage system of the tractor.

3. The combination of claim 2, together with rearwardly projecting arms on the rear frame bar, and vertically spaced tool bars mounted on said arms in spaced parallelism with said rear bar.

4. The combination of claim 3, together with vertical sleeves on the front bar, shanks mounted for vertical sliding adjustment in said sleeves, setscrews in the sleeves for securing the shanks in adjusted position, and ground-engaging shoes on the lower ends of said shanks.

References Cited in the file of this patent

UNITED STATES PATENTS

| | | |
|---|---|---|
| 1,123,991 | Carpenter | Jan. 5, 1915 |
| 1,795,182 | Ross | Mar. 3, 1931 |
| 2,644,386 | Sutton | July 7, 1953 |
| 2,690,145 | Romain | Sept. 28, 1954 |
| 2,793,576 | Carpi | May 28, 1957 |
| 3,029,879 | Wells | Apr. 17, 1962 |
| 3,066,743 | Hines | Dec. 4, 1962 |